US005743653A

United States Patent [19]
Katoh

[11] Patent Number: 5,743,653
[45] Date of Patent: Apr. 28, 1998

[54] LINEAR MOTION ROLLING GUIDE UNIT APPARATUS

[75] Inventor: Masataka Katoh, Seki, Japan

[73] Assignee: Nippon Thompson Co., Ltd., Tokyo, Japan

[21] Appl. No.: 734,922

[22] Filed: Oct. 22, 1996

[30] Foreign Application Priority Data

Dec. 25, 1995 [JP] Japan ................................. 7-349984

[51] Int. Cl.⁶ ...................................................... F16C 29/06
[52] U.S. Cl. ................................ 384/43; 384/45; 384/53
[58] Field of Search ................................. 384/8, 21, 35, 384/43, 44, 45, 49, 53

[56] References Cited

U.S. PATENT DOCUMENTS

| | | | |
|---|---|---|---|
| 4,489,990 | 12/1984 | Teramachi | 384/43 |
| 4,953,990 | 9/1990 | Wojcik | 384/21 X |
| 5,242,227 | 9/1993 | Komiya et al. | 384/53 X |

FOREIGN PATENT DOCUMENTS

| | | |
|---|---|---|
| 62-11209 | 3/1987 | Japan . |
| 62-4575 | 6/1994 | Japan . |

*Primary Examiner*—Thomas R. Hannon
*Attorney, Agent, or Firm*—Browdy and Neimark

[57] ABSTRACT

In this linear motion rolling guide unit apparatus, a movable track rail is moved relatively to a fixed track rail via a pair of sliders, and one slider is kept stopped with respect to the movement of the track rail, whereby a smooth and stable sliding movement of the track rail can be made. The two sliders are provided between the movable track rail and fixed track rail so that the sliders are moved independently of and relatively to each other. The two track rails are provided with connecting members on the portions thereof which correspond to the terminal ends of the movements of the sliders, and the two sliders members to be connected which are adapted to be detachably engaged with the connecting members.

18 Claims, 6 Drawing Sheets

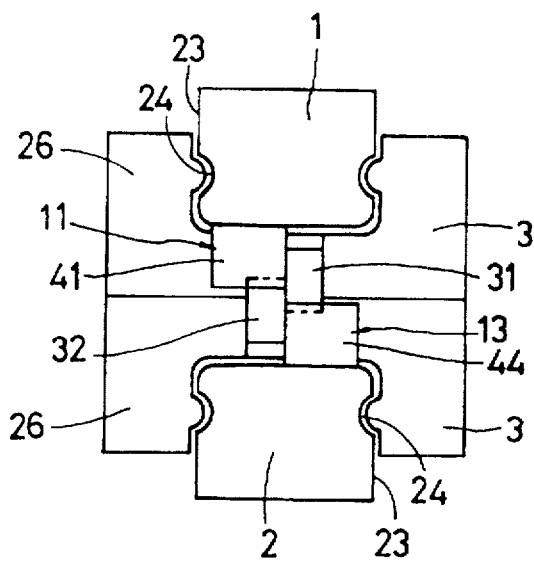
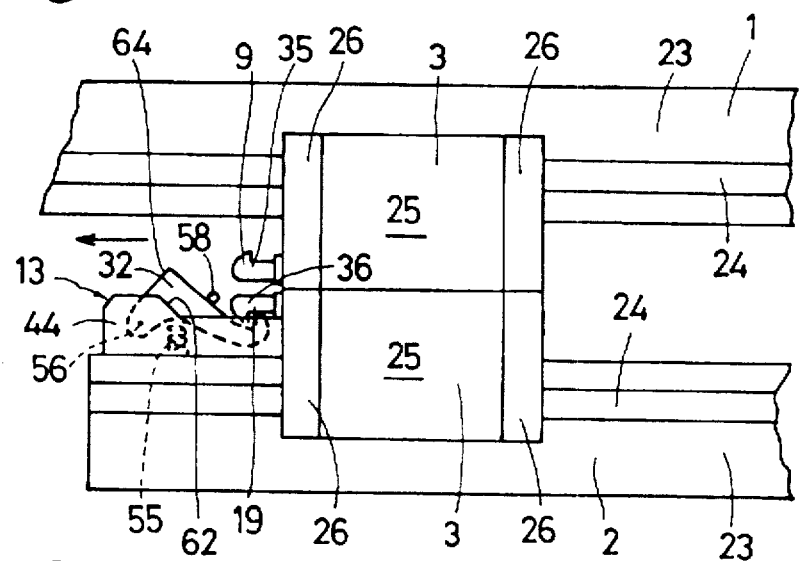
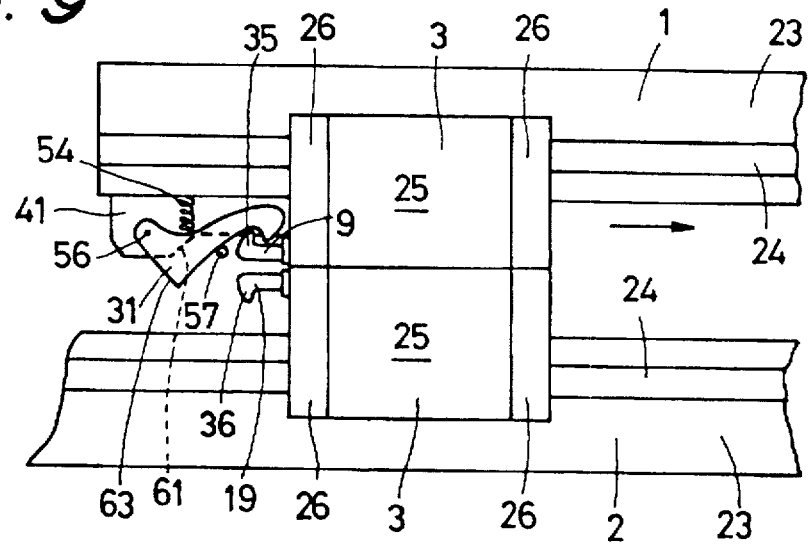

5,743,653

LINEAR MOTION ROLLING GUIDE UNIT APPARATUS

BACKGROUND OF THE INVENTION

1. Field of the Invention

This invention relates to a linear motion rolling guide unit apparatus comprising a pair of sliders saddled on a pair of track rails and moved slidingly thereon and relatively to each other, and applied to a working robot, a semiconductor manufacturing apparatus, a transfer apparatus and a precision machine tool.

2. Description of the Prior Art

There is a linear motion rolling guide unit as a basic and multi-purpose apparatus for supporting the mechatronic techniques which have been developed remarkably in recent years. The linear motion rolling guide unit is now incorporated in the apparatuses in various technical fields and used in practice which include a semiconductor manufacturing apparatus, an inspection apparatus, a transfer apparatus and an industrial robot, with the fields of application still expanding with technology development.

Regarding the linear motion rolling guide unit, an improvement in the accuracy thereof, an increase in the speed of a sliding movement thereof and a decrease in the dimensions thereof have been increasingly demanded. Concerning, for example, an assembling robot, an increase in the range of use thereof has been demanded, and from large-sized assembling robots to small-sized assembling robots have been manufactured. Linear motion rolling guide units capable of attaining a higher accuracy, a higher speed and smaller dimensions, or meeting the requirement of responding to flexible guide operations have been demanded as linear motion rolling guide units to be incorporated in such assembling robots.

Japanese Utility Model Publication No. 24575/1994 discloses a transfer apparatus for moving a working machine or tool, such as an arm of an industrial robot. Such a transfer apparatus is provided with a slider saddled on an upper track rail and a lower track rail and moved relatively, rack teeth formed on the opposed surfaces of the upper and lower track rails, pinions provided on the slider and engaged in a driving relation with the two sets of rack teeth.

There is an apparatus used as a table transfer apparatus, which is disclosed in Japanese Patent Publication No. 11209/1987. This table transfer apparatus is used for an arm of an industrial robot which is adapted to hold a work and be moved back and forth, and which comprises a pair of lower track bases mounted on and in parallel with a base; front and rear sets of bearing bodies mounted on the lower track bases so that the bearing bodies can be moved axially, each of which sets comprises left and right bearing bodies; left and right upper track bases fixed to the bearing bodies so that the upper track bases can be relatively moved; and a movable table fixed to the upper track bases.

A linear motion rolling guide unit shown in FIG. 12 is known. This linear motion rolling guide unit is provided with raceway grooves 24 in both of longitudinal side surfaces 23 of a track rail 22. A slider 21 is placed in a saddled state on the track rail 22, and moved slidingly and freely via rolling elements moved circulatingly along the raceway grooves 24 in the track rail 22. The track rail 22 is provided with a plurality of mounting holes 33 in a mutually spaced manner in a longitudinally extending upper surface 34 thereof. The slider 21 has a casing 25 capable of being moved relatively to the track rail 22, and end caps 26 fixed to both ends of the casing 25.

The casing 25 is provided in its upper portion with screw holes 39 for use in mounting other machine or part thereon. The casing 25 and end caps 26 are provided in lower surfaces thereof with recesses 30 so that the casing 25 and end caps 26 are moved with the casing and end caps saddled on the track rail 22, and raceway grooves 29 are formed in the portions of the surfaces of the recesses 30 which are opposed to the raceway grooves 24 in the track rail 22. Rolling elements 27 comprising balls are inserted in raceways formed by the opposed raceway grooves 24, 29, in such a manner that the rolling elements roll in the raceways. In order to prevent the rolling elements 27 from falling from the casing 25, retainer bands 28 are provided in the casing 25 so as to enclose the rolling elements 27. Bolts (not shown) are inserted into the mounting holes 33 formed in the longitudinally extending upper surface 34 of the track rail 22, and then screwed to screw holes formed in a mount, whereby the track rail 22 can be fixed to a base (not shown), such as a bed, a machine base and a working base.

Both of the end caps 26 are provided with claws by which the rolling elements 27 are scooped from the raceway grooves 24 constituting load tracks with respect to the track rail 22, and direction changing passages for changing the direction of rolling of the rolling elements 27 for the circulation thereof. The end caps 26 have side seals 37 attached thereto which attain the sealing of clearances between the track rail 22 and both of longitudinal end portions of the slide 21, and also grease nipples 40 fixed thereto and used to supply a lubricant to sliding surfaces between the track rail 22 and slider 21. The end caps 26 are attached to both end surfaces of the casing 25 by screws 42 passed through a plurality of mounting holes. The rolling elements 27 in a load region which roll in the raceway grooves 24 in the track rail 22 are guided to the direction changing passages formed in the end caps 26, and then moved to return bores 43 formed in parallel with the raceway grooves 29 in an upper portion of the casing 25, the rolling elements 27 thus rolling in the endless circulating passages. Owing to the rolling of the loaded rolling elements 27 rolling between the raceway grooves 29 formed in the slider 21 and those 24 formed in the track rail 22, the track rail 22 and slider 21 can be moved relatively to each other smoothly.

A linear motion rolling guide unit apparatus formed by compactly combining the linear motion rolling guide unit shown in FIG. 12, in such a manner as shown in FIG. 11 is also known. In this apparatus, a pair of sliders 21 unitarily combined with their flat surfaces contacting each other are saddled on a pair of track rails 22 so that the track rails can be moved relatively to each other.

However, it is difficult that the table transfer apparatus mentioned above be used as a transfer apparatus for, for example, a working robot and a semiconductor manufacturing apparatus in which the sliders are moved freely on the track rails without being restrained, in accordance with a movement of one track rail. Since the sliders are put in a freely movable state in accordance with a movement of the track rail, the stability of a table fixed on the track rail now in motion is deteriorated, and an accurate or highly precise movement thereof cannot be made.

SUMMARY OF THE INVENTION

An object of the present invention is to provide a linear motion rolling guide unit apparatus wherein a pair of linear motion rolling guide units are combined or one track rail is moved slidingly and relatively to the other track rail via a pair of slides formed to a unitary structure, one track rail being moved highly accurately, stably and relatively to the other, the apparatus being preferably applied to a semiconductor manufacturing apparatus, a working robot, a transfer apparatus and a precision machine tool.

This invention relates to a linear motion rolling guide unit apparatus comprising a pair of track rails provided with longitudinally extending raceway grooves in both of their respective longitudinal side surfaces; a pair of slider provided between the two track rails, having raceway grooves opposed to those in the track rails, saddled on the track rails and moved slidingly and relatively to each other and also independently of and relatively to each other; connecting members provided at the portions of the two track rails at which the sliding movements of the sliders terminate; and members to be connected which are provided on the two sliders and joined disengageably to the connecting members. The rolling elements are loaded in raceways formed by the first raceway grooves in the track rails and the second raceway grooves in the sliders, in such a manner that the rolling elements roll in these raceways.

The connecting members comprise chucks, and the members to be connected members engageable with the chucks, such as hooks or right-angled members. In another case, the members to be connected comprise chucks, and the connecting members engageable with the members to be connected, such as hooks or right-angled members engageable with the chucks.

The connecting members comprise spring members provided with rollers at the front end portions thereof, and the members to be connected locking members provided with recesses with which the rollers are engageable. In another case, the members to be connected comprise spring members provided with rollers at the front end portions thereof, and the connecting members locking members provided with recesses with which the rollers are engageable.

In another case, the connecting members comprise magnets, and the members to be connected magnetic members adapted to be attracted to the magnets. In another case, the members to be connected comprise magnets, and the connecting members magnetic members adapted to be attracted to the magnets.

In another case, the connecting members comprise angled members fixed pivotably to the track rails, and the members to be connected hooks engageable with the angled members by the resilient force of spring members provided on the angled members. In another case, the members to be connected comprise angled members fixed pivotably to the track rails, and the connecting members hooks engageable with the angled members by the resilient force of spring members provided on the angled members.

Regarding the angled member fixed to one track rail, a projecting inclined surface provided on the other track rail presses an inclined contact surface provided on the mentioned angled member, in accordance with the relative movement of two track rails to cause the same angled member to be moved pivotally against the resilient force of the relative spring member, whereby the angled member is disengaged from the relative hook.

Each slider comprises a first slider portion saddled on one track rail and moved slidingly thereon, and a second slider portion saddled on the other track rail and moved slidingly thereon, these two slider portions being fixed to each other unitarily.

One track rail is fixed to a base to form a fixed track rail, while the other track rail forms a movable track rail to which a table is fixed. A ball nut housing moved by a turning movement of a ball screw fixed to the base is fastened to the table.

When one track rail is moved, at least one slider is joined to the fixed track rail and stands still. Accordingly, the movable track rail can be moved slidingly and stably on the fixed track rail.

In this linear motion rolling guide unit apparatus, the members to be connected of the two sliders are joined when one track rail is moved as mentioned above to either connecting member of either track rail, and the sliders are not freely moved, the sliding movement of this track rail becoming very smooth and stable.

When the table is moved relatively to the base via a pair of sliders in this linear motion rolling guide unit apparatus in which one track rail is fixed to the base, such as a machine base with the table fixed to the other track rail, the two sliders are connected to and united with either track rail, and either slider is connected to the fixed track rail and stands still, the other slider being connected to the movable track rail and moved. The movable track rail is supported stably on the two sliders and can be moved slidingly with a high accuracy.

A working machine provided on the table fixed to the movable track rail is supported on the fixed track rail via the two sliders, and can make a stable working movement even when a working load is imparted thereto. Namely, in this linear motion rolling guide unit apparatus, the two sliders can be kept connected to either track rail even when moment is imparted to a front end portion of the movable track rail, and the disorder of and a load on the sliders are minimized. In addition, a smooth sliding movement of the movable track rail can be attained. Therefore, this apparatus has a high durability and a long life.

This linear motion rolling guide unit apparatus is used for a linear motion table apparatus applied to a semiconductor manufacturing apparatus, a working robot and a precision machine tool which demand a strictly high accuracy, and it can meet the demand for a higher accuracy and a higher sliding speed of a table and provide a compact or flexible guide apparatus. In this linear motion rolling guide unit apparatus, it is possible to fix one track rail and guide the movable track rail smoothly with a high accuracy via a pair of sliders with respect to the fixed track rail, and, moreover, more slidingly and smoothly with a high accuracy the two relatively movable track rails via a pair of sliders.

This linear motion rolling guide unit apparatus also enables the number of parts for forming the relatively movable members to be reduced, the movable track rail to be moved slidingly with respect to the fixed track rail with one slider kept stopped owing to the provision of the connecting members and members to be connected, the inertial force of a moving body of a combination of one track rail with one slider to be minimized, and the controlling and operating responsiveness for moving the table fixed to the movable track rail to be improved. Moreover, in this linear motion rolling guide unit apparatus, the track rails and sliders are utilized as mere relatively movable intermediate members for moving the table, and the apparatus as a whole can be formed to a compact structure.

BRIEF DESCRIPTION OF THE DRAWINGS

FIG. 7 is an end view of the apparatus of FIG. 6;

FIG. 8 is an explanatory view showing one operating condition of the linear motion rolling guide unit apparatus of FIG. 6.

FIG. 9 is an explanatory view showing another operating condition of the linear motion rolling guide unit apparatus of FIG. 6;

DESCRIPTION OF THE PREFERRED EMBODIMENTS

The embodiments of the linear motion rolling guide unit apparatus according to the present invention will now be described.

Figure 2:
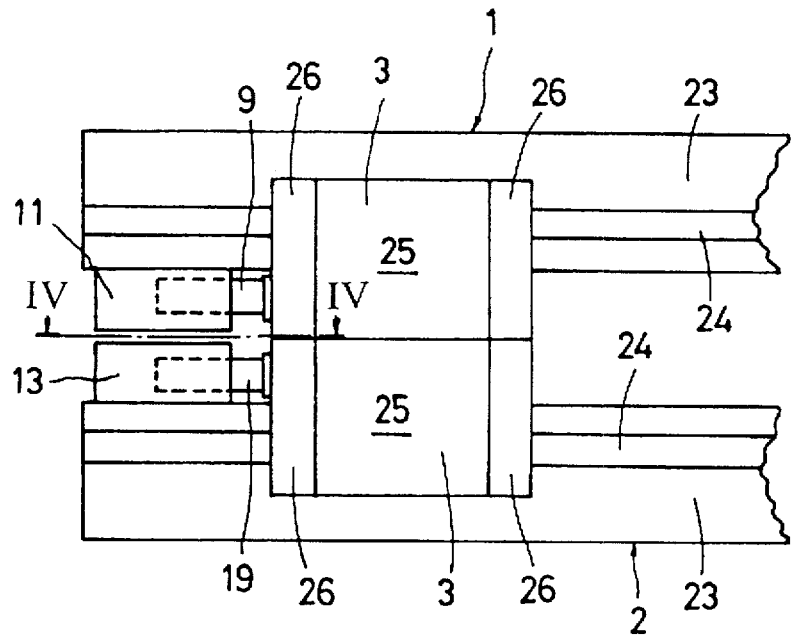
FIG. 2 is a side view showing a part of the linear motion rolling guide unit apparatus of FIG. 1.
Figure 3:
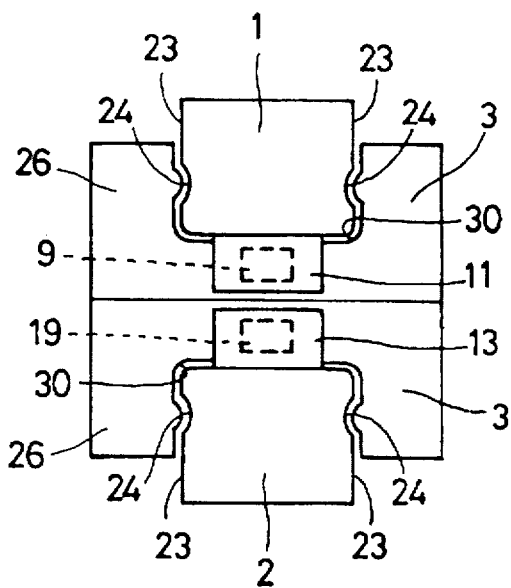
FIG. 3 is an end view of the apparatus of FIG. 2.
Figure 12:
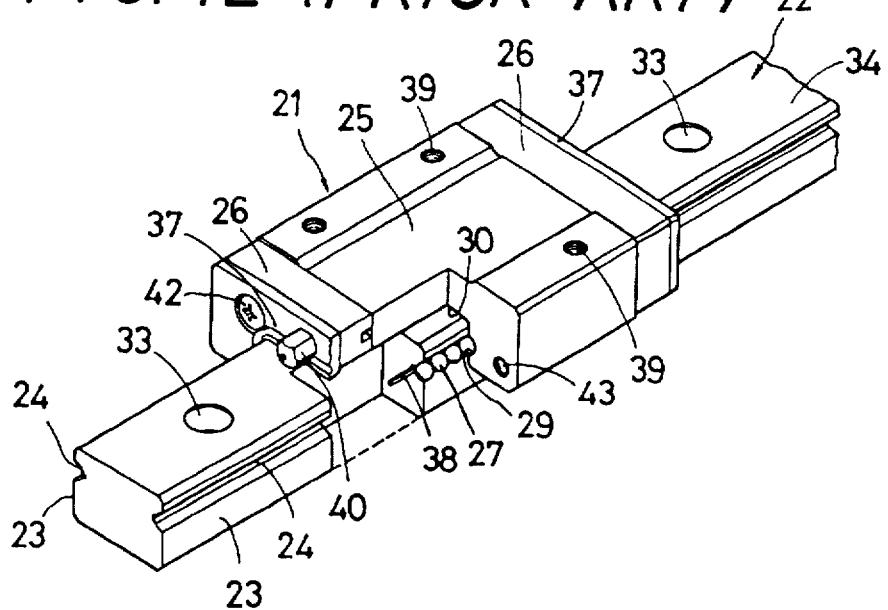
FIG. 12 is a perspective view showing a conventional linear motion rolling guide unit.

A first embodiment of the linear motion rolling guide unit apparatus will now be described with reference to FIGS. 1, 2 and 3. This linear motion rolling guide unit apparatus comprises a pair of track rails 1, 2 extending in the same direction, and a pair of sliders 3, 4 arranged between the two tracks rails 1, 2 and adapted to be slidingly moved with the sliders saddled at their recesses 30 on the track rails 1, 2. The two track rails 1, 2 are provided with raceway grooves 24 extending in both of the longitudinal side surfaces 23 thereof. The two sliders 3, 4 are saddled on the track rails 1, 2 so that the former are slid relatively to and independently of each other on the latter. The lower track rail 2 is described as a fixed track rail set firmly on a base (refer to what is designated by a reference numeral 28 in FIG. 10), such as a bed or a machine base. The upper track rail 1 is a movable track rail adapted to be moved slidingly with respect to the track rail 2 via the sliders 3, 4. The sliders 3, 4 comprise a combination slider formed by fixing, for example, such sliders 21 as in the linear motion rolling guide unit of FIG. 12 to each other back-to-back to provide a unitary structure of the upper and lower sliders 21. The sliders 3, 4 are provided at their upper and lower portions with raceway grooves (refer to what is designated by a reference numeral 29 in FIG. 12) opposed to the raceway grooves 24 in the track rails 1, 2. The sliders 3, 4 are shown with casings 25 and end caps 26 in linear motion rolling guide units in FIG. 2.

Figure 11:
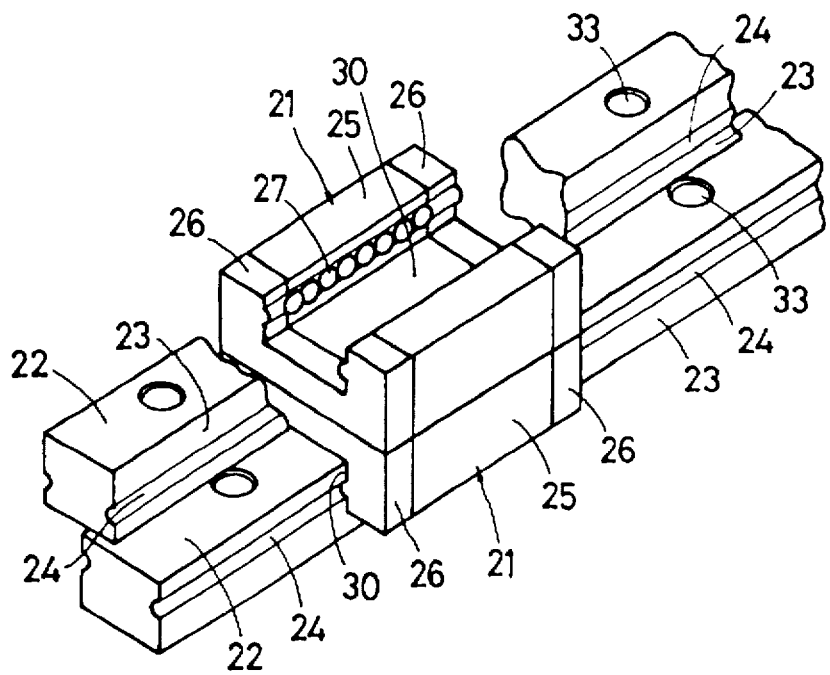
FIG. 11 is a partially cutaway perspective view showing a conventional linear motion rolling guide unit apparatus.

Rolling elements (designated by a reference numeral 27 in FIG. 11 or FIG. 12) are loaded in endless raceways, which are formed by raceways comprising the raceway grooves 24 in the track rails 1, 2 and those (refer to what is designated by a reference numeral 29 in FIG. 12) in the casings 25 of the sliders 3, 4, direction changing passages formed in the end caps 26, and return passages (refer to what is designated by a reference numeral 43 in FIG. 12) formed in the casings 25, in such a manner that the rolling elements are circulated endlessly in the endless raceways.

In the first embodiment, the upper slidingly movable track rail 1 is provided at both of the stroke end portions thereof, i.e. the end portions thereof at which the sliding movements of the sliders terminate with connecting members 11, 12. The lower track rail 2 fixed to a base is provided at both end portions thereof at which the sliding movements of the sliders terminate with connecting members 13, 14. The slider 3 is provided at an upper portion thereof with a member 9 to be connected which is adapted to be disengageably joined to the connecting member 11 on the upper track rail 1, and at a lower portion thereof with a member 19 to be connected which is adapted to be disengageably joined to the connecting member 13 on the lower track rail 2.

The slider 4 is provided at an upper portion thereof with a member 10 to be connected which is adapted to be disengageably joined to the connecting member 12 on the upper track rail 1, and at a lower portion thereof with a member 20 to be connected which is adapted to be disengageably joined to the connecting member 14 on the lower track rail 2. Although the end portions at which the sliding movements of the sliders terminate correspond to both end portions of the track rails 1, 2, they can be set to suitable positions on the inner side of the end portions of the track rails 1, 2 depending on conditions of use of the apparatus, and the connecting members 11, 12, 13, 14 can be provided on these set portions. For example, the connecting members 11, 12, 13, 14 comprise chucks, and the members to be connected 9, 10, 19, 20 hooks or members to be engaged with the chucks.

This linear motion rolling guide unit apparatus is constructed as described above, and operated as follows. The lower track rail 2 is fixed on a base, such as a bed or machine base between points S3 and S7. Referring to FIG. 1A, the upper track rail 1 is moved slidingly so as to be in the extreme left side position, which is between points S1 and S5. In this condition, the connecting member 13 on the track rail 2 is joined to the member to be connected 19 on the slider 3, and the connecting member 12 on the track rail 1 the member to be connected 10 on the slider 4. Accordingly, in the condition shown in FIG. 1A, the sliders 3 is connected to the track rail 2, and the slider 4 the track rail 1. As long as an external force is not applied to the sliders 3, 4, they are not moved freely on the track rails 1, 2, so that the track rail 1 and sliders 3, 4 can be maintained in a stopped state stably with respect to the track rail 2.

FIG. 1B shows the movable track rail 1 moved slidingly from the point S1 to a point S2 by an external force such as by a motor or a ball screw (refer to FIG. 10), this upper track rail 1 being positioned between the point S2 and a point 6. The fixed track rail 2 is positioned between points S3, S7 without being moved. When the track rial 1 is moved slidingly, it draws the slider 4 and moves slidingly therewith with respect to the track rail 2 but the slider 3 is joined to the track rail 2 and kept stopped. In this condition, the connecting member 13 on the track rail 2 is kept joined to the member to be connected 19 on the slider 3, while the connecting member 12 on the track rail 1 is kept joined to the member to be connected 10 on the slider 4. Therefore, in the condition shown in FIG. 1B, the slider 3 is joined to the track rail 2, and the slider 4 the track rail 1. As long as an external force is not applied to the sliders 3, 4, they are not moved freely on the track rails 1, 2, and the track rail 1 and sliders 3, 4 can be kept stopped stably with respect to the track rail 2.

FIG. 1C shows the condition in which the upper track rail 1 is further moved slidingly from the point S2 to the point S3 by an external force such as by a motor or a ball screw, the upper track rail 1 being positioned between the points S3, S7. The fixed track rail 2 is positioned between the points S3, S7 without being moved. During the sliding movement of the track rail 1, it draws the slider 4 and moves therewith relatively to the track rail 2 but the slider 3 is joined to the track rail 2 and kept stopped. In this condition, the connecting member 13 on the track rail 2 is kept joined to the member to be connected 19 on the slider 3, while the connecting member 12 on the track rail 1 is kept joined to the member to be connected 10 on the slider 4. The connecting member 11 on the track rail 2 is joined to the member to be connected 9 on the slider 3, while the connecting member 14 on the track rail 1 is joined to the member to be connected 9 on the slider 3. Accordingly, in the condition shown in FIG. 10, the sliders 3, 4 are joined to the track rails 1, 2, and, as long as an external force is not applied to the sliders 3, 4, they are not moved freely on the track rails 1, 2, so that the track rail 1 and sliders 3, 4 can be kept stopped stably with respect to the track rail 2.

FIG. 1D shows the condition in which the upper track rail 1 is further moved slidingly from the point S3 to a point S4 by an external force such as by a motor or a ball screw, the upper track rail 1 being positioned between the point S4 and a point S8. The fixed track rail 2 is positioned between the points S3, S7 without being moved. During the sliding movement of the track rail 1, it presses the slider 3 and thereby moves slidingly therewith respect to the track rail 2 but the slider 4 is joined to the track rail 2 and kept stopped. In this condition, the member to be connected 19 on the slider 3 is disengaged from the connecting member 13 on the track rail 2, and the member to be connected 10 on the slider 4 from the connecting member 12 on the track rail 1. However, the connecting member 11 on the track rail 2 is kept joined to the member to be connected 9 on the slider 3, and the connecting member 14 on the track rail 1 to the member to be connected 20 on the slider 4. Accordingly, in the condition shown in FIG. 1D, the slider 3 is connected to the track rail 1, and the slider 4 to the track rail 2. Therefore, as long as an external force is not applied to the sliders 3, 4, they are not moved freely on the track rail 1, 2, and the track rail 1 and sliders 3, 4 can be kept stopped stably with respect to the track rail 2.

FIG. 1E shows the condition in which the upper track rail 1 is further moved slidingly from a point S4 to a point S5 by an external force such as by a motor or a ball screw, the upper track rail 1 being positioned between the points S5, S9. The fixed track rail 2 is positioned between the points S3, S7 without being moved. During the sliding movement of the track rail 1, it presses the slider 3 and moves slidingly therewith with respect to the track rail 2 but the slider 4 is joined to the track rail 2 and kept stopped. In this condition, the connecting member 11 on the track rail 2 is kept joined to the member to be connected 9 on the slider 3, while the connecting member 14 on the track rail 1 to the member to be connected 20 on the slider 4. Accordingly, in the condition shown in FIG. 1E, the slider 3 is connected to the track rail 1, and the slider 4 to the track rail 2. Therefore, as long as an external force is not applied to the sliders 3, 4, they are not moved freely on the track rails 1, 2, and the track rail 1 and sliders 3, 4 can be kept stopped stably with respect to the track rail 2.

Figure 1:
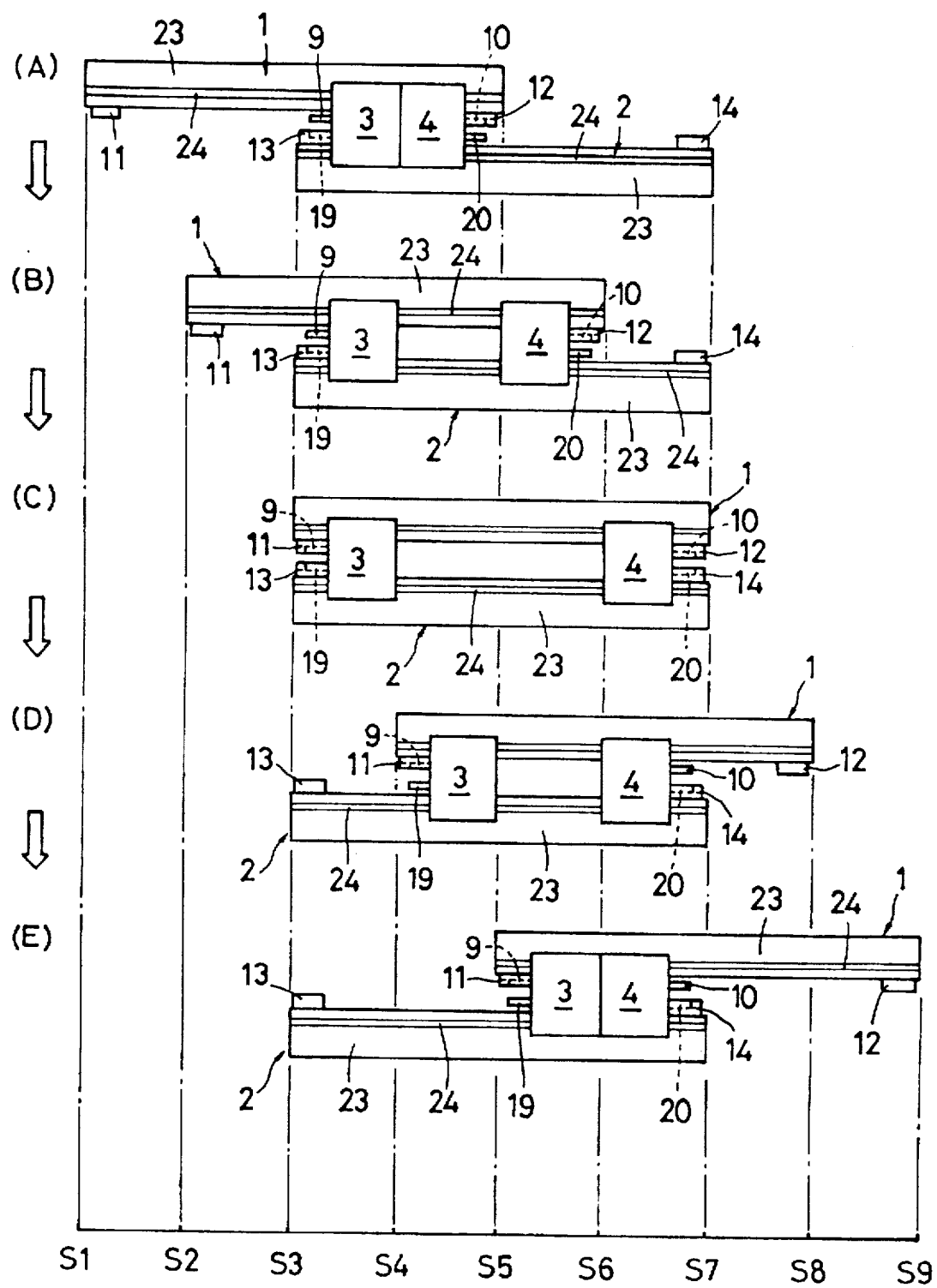
FIG. 1 is an explanatory view showing the operating condition of a first embodiment of the linear motion rolling guide unit apparatus according to the present invention.

In the above-described operation of this linear motion rolling guide unit apparatus, the sliding movement of the movable track rail 1 from the left end of FIG. 1 to the right end thereof is illustrated. Since a sliding movement of the movable track rail 1 in the opposite direction, i.e., from the right end of FIG. 1 to the left end thereof can be made by reversing the steps carried out in the above-described embodiment, a description of this sliding movement is omitted.

Figure 4:
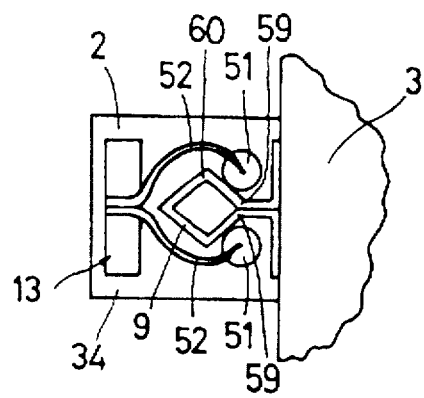
FIG. 4 is a plan view, which corresponds to a drawing taken along the arrowed line A—A in FIG. 2, showing a second embodiment of the linear motion rolling guide unit apparatus according to the present invention.

A second embodiment of the linear motion rolling guide unit apparatus according to the present invention will now be described with reference to FIG. 4. In the second embodiment, concrete structures of a connecting member and a member to be connected are shown. A connecting member 13 comprises spring members 52 provided with rollers 51 at the free end portions thereof, and a member to be connected 19 a locking member provided with recesses 59 with which the rollers 51 are engaged. The connecting member 13 and member to be connected 19 can also be so formed that they have structures contrary to these structures. The connecting member 13 comprises a pair of spring members 52 provided on an upper surface 34 of a track rail 2, having rollers 51 fixed rotatably to the free end portions thereof, and bent inward toward each other at the free end portions thereof. The member to be connected 19 has a projecting portion 60 at a free end part thereof, and recesses 59, with which the rollers 51 are engaged, at a root portion thereof. Accordingly, when the member to be connected 19 on the slider 3 is moved close to the connecting member 13 on the track rail 2, the projecting portion 60 is guided by the rollers 51 and fitted between the spring members 52, so that the member 19 is joined to the connecting member 13 by a resilient force. When the member to be connected 19 on the slider 3 is disengaged from the connecting member 13 on the track rail 2, the projecting portion 60 is disengaged against the resilient force of the spring members 52.

Figure 5:
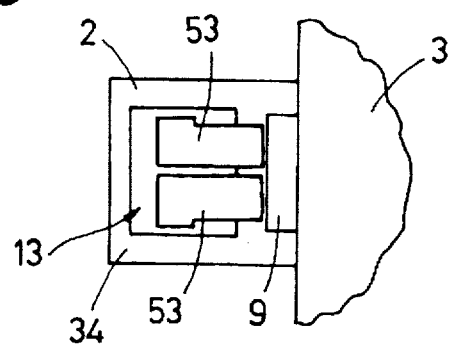
FIG. 5 is a plan view, which corresponds to a drawing taken along the arrowed line A—A in FIG. 2, showing a third embodiment of the linear motion rolling guide unit apparatus according to the present invention.

A third embodiment of the linear motion rolling guide unit apparatus according to the present invention will now be described with reference to FIG. 5. In this third embodiment, a connecting member 13 comprises a pair of permanent magnets 53, and a member to be connected 19 a magnetic body adapted to be attracted to the permanent magnets 53. The members 13, 19 can, of course, be formed the other way around. These members 13, 19 can be separated when a tensile force larger than the magnetic force of the permanent magnets 53 is exerted thereon.

A fourth embodiment of the linear motion rolling guide unit apparatus according to the present invention will now be described with reference to FIGS. 6–9.

In the fourth embodiment, the connecting members 11, 13 comprise angled members 31, 32 constituting chucks, and the members to be connected 9, 19 hooks 35, 36 adapted to be engaged with the angled members 31, 32. A track rail 1 is provided on its lower surface with a mount member 41 to which the angled member 31 is fixed, while a track rail 2 is provided on its upper surface with a mount member 44 to which the angled member 32 is fixed. The angled members 31, 32 are mounted pivotably on pins, i.e. pivots 56 provided on the mount members 41, 44. The track rail 1 is provided with a stopper 57 for limiting a pivotal movement of the angled member 31, and also a spring 54 for engaging the angled member 31 with the stopper 57 by a resilient force thereof. The track rail 2 is provided with a stopper 58 for limiting a pivotal movement of the angled member 32, and also a spring 55 for engaging the angled member 32 with the stopper 58 by a resilient force thereof.

The angled members 31, 32 are provided on their arm portions with inclined contact surfaces 63, 64 adapted to impinge upon projecting inclined surfaces 61, 62 of the mount members 41, 44 and moved pivotally against the resilient force of the springs 54, 55. In the fourth embodiment, the connecting members 11, 13 are provided on the lower surface and upper surface respectively of the track rails 1, 2. These connecting members can also be provided on the side surfaces of the track rails, and the members to be connected 9, 19 can be provided on sliders 3, 4 correspondingly to the connecting members. When occasion demands, these members 11, 13, 9, 19 may be fixed via members, such as brackets instead of being fixed directly as illustrated.

Figure 6:
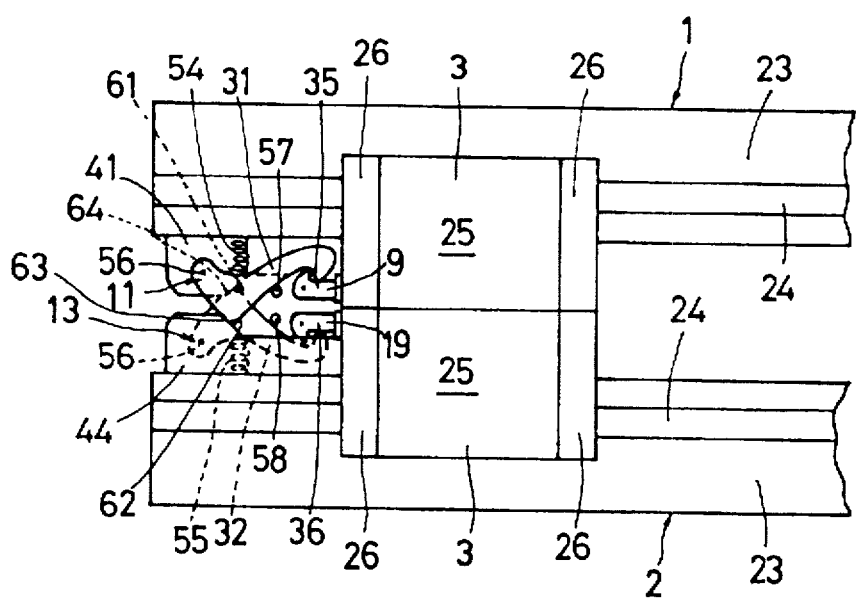
FIG. 6 is a side view showing a part of a fourth embodiment of the linear motion rolling guide unit apparatus according to the present invention.

FIG. 6 shows track rails 1, 2 in the same condition as shown in FIG. 1C, in which the illustrated track rails 1, 2 are stopped in the same shown, with the angled members 31, 32 engaged with hooks 35, 36 respectively. FIG. 8 shows the track rail 1 in the same condition as shown in FIGS. 1A and 1B, in which the illustrated track rail 1 is moved with respect to the track rail 2, with the angled member 31 disengaged from the hook 35 and with the angled member 32 engaged with the hook 36. FIG. 9 shows the track rail 1 in the same condition as shown in FIGS. 1D and 1E, in which the illustrated track rail is moved with respect to the track rail 2, with the angled member 32, disengaged from the hook 36 and with the angled member 31 engaged with the hook 35.

In the case of, for example, the sliders 3 in the fourth embodiment with the track rail 1 moved with respect to the track rail 2 from the position shown in FIG. 1C to the positioned shown in FIGS. 1A and 1B, i.e., in the leftward direction, the projecting inclined surface 62 of the mount member 44 on the track rail 2 presses upward the inclined contact surface 63 of the angled member 31 fixed to the track rail 1, and turn the angled member 31 counterclockwise around the pivot 56 against the resilient force of the spring 54. Consequently, the angled member 31 and hook 35 are disengaged from each other as shown in FIG. 8, and the connecting member 11 and member to be connected 9 from each other as well, so that the track rail 1 can be moved slidingly to left and right with respect to the track rail 2. In the meantime, the angled member 32 impinges upon the stopper 58 due to the resilient force of the spring 55, and is kept engaged with the hook 36.

In the case of, for example, the sliders 3 with the track rail 1 moved with respect to the track rail 2 from the position shown in FIG. 1C to the positions shown in FIGS. 1D and 1E, i.e., in the rightward direction, the projecting inclined surface 61 of the mount member 41 on the track rail 1 presses down the inclined contact surface 64 of the angled member 32 fixed to the track rail 2, and turn the angled member 32 clockwise around the pivot 56 against the resilient force of the spring 55. Consequently, the angled member 32 and hook 36 are disengaged from each other as shown in FIG. 9, and the connecting member 13 (FIG. 8) and member to be connected 19 from each other as well, so that the track rail 1 can move slidingly to left and right with respect to the track rail 2. In the meantime, the angled member 31 impinges upon the stopper 57 due to the resilient force of the spring 54, and is kept engaged with the hook 35. Also, in the case of the sliders 4, in which the engaged condition of the connecting members and members to be connected on the upper and lower sides is opposite to that thereof in the case of the sliders 3 (the engaged condition of the sliders 4 is as shown in FIG. 9 when that of the sliders 3 is as shown in FIG. 8, or the engaged condition of the former is as shown in FIG. 8 when that of the latter is as shown in FIG. 9), the sliders 4 are operated in the same manner.

Figure 10:
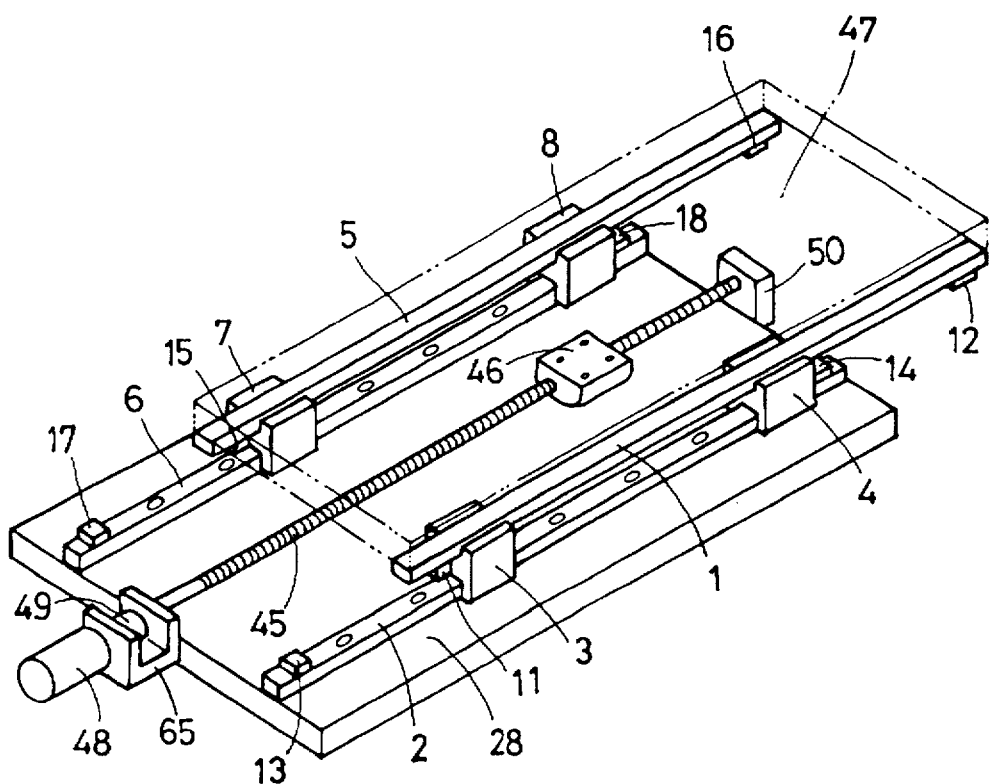
FIG. 10 is a perspective view showing an applied example of the linear motion rolling guide unit apparatus according to the present invention.

A fifth embodiment of the linear motion rolling guide unit apparatus according to the present invention will now be described with reference to FIG. 10. The fifth embodiment is applied to a linear motion table apparatus using a pair of linear motion rolling guide unit apparatuses and moving a table 47 on a base 28. In the linear motion table apparatus of the fifth embodiment, the linear motion rolling guide unit apparatuses are provided in parallel with each other on the base 28 so that these apparatuses are spaced by a predetermined distance, and a pair of track rails 2, 6 are fixed on the base 28, another pair of track rails 1, 5 being provided slidably with respect to the track rails 2, 6 via sliders 3, 4, 7, 8. A table 47 is fixed on the track rails 2, 6. The track rail 1 is provided with connecting members 11, 12, the track rail 2 connecting members 13, 14, the track rail 5 connecting members 15, 16, and the track rail 6 connecting members 17, 18. The sliders 3, 4, 7, 8 are provided with members to be connected (not shown) which are adapted to be engaged with the connecting members 11, 12, 13, 14, 15, 16, 17, 18.

The table 47 in the fifth embodiment is moved by turning a ball screw 45, which is fixed to the base 28, and which has a ball nut housing 46 fixed to the table 47, by a driving motor 48. The ball screw 45 is supported pivotably between a pair of support members 50, 65 fixed in mutually spaced manner to the base 8. The driving motor 48 is formed so as to turn the ball screw 45 via a coupling 49. When the ball screw 45 is turned by the driving motor 48, a ball screw nut (not shown) provided in the ball nut housing 46 is moved along the ball screw 45,so that the table 47 fixed to the ball nut housing 46 is moved.

The fifth embodiment is constructed as described above. Namely, it can be formed to a compact structure, and the table 47 can obtain a maximum stroke with respect to the base 28 in the axial direction of the track rails 1, 2, 5, 6 except the portion of the table 47 at which the upper and lower track rails 1, 2; 5, 6 minimally overlap each other. The table 47 can be kept stable even when a load is on a free end portion thereof since the sliders 3, 4; 7, 8 are provided at both end portions of a zone in which the track rails 1, 2; 5, 6 are superposed on and overlap each other. Accordingly, a stable linear motion table apparatus can be provided.

What is claimed is:

1. A linear motion rolling guide unit apparatus comprising a pair of track rails provided with first raceway grooves extending in both of longitudinal side surfaces thereof; a pair of sliders provided between said two track rails, having raceway grooves opposed to those in said track rails, saddled on said track rails and moved slidingly and relatively to each other and also independently of and relatively to each other; connecting members provided on stroke end portions of said two track rails; and members to be connected provided on said two sliders and adapted to be engaged detachably with said connecting members.

2. A linear motion rolling guide unit apparatus according to claim 1, wherein said connecting members comprise chucks, said members to be connected comprising members to be gripped by said chucks.

3. A linear motion rolling guide unit apparatus according to claim 2, wherein the members to be gripped by said chucks comprise hooks.

4. A linear motion rolling guide unit apparatus according to claim 2, wherein the members to be gripped by said chucks comprise angled members engageable with said chucks.

5. A linear motion rolling guide unit apparatus according to claim 1, wherein said members to be connected comprise chucks, said connecting members comprising members to be gripped by said chucks.

6. A linear motion rolling guide unit apparatus according to claim 5, wherein the members to be gripped by said chucks comprise hooks.

7. A linear motion rolling guide unit apparatus according to claim 5, wherein the members to be gripped by said chucks comprise angled members engageable with said chucks.

8. A linear motion rolling guide unit apparatus according to claim 1, wherein said connecting member comprise spring members provided with rollers at free end portions thereof, said members to be connected comprising locking members provided with recesses with which said rollers are engageable.

9. A linear motion rolling guide unit apparatus according to claim 1, wherein said members to be connected comprise spring members provided with rollers at free end portions thereof, said connecting members comprising locking members provided with recesses with which said rollers are engageable.

10. A linear motion rolling guide unit apparatus according to claim 1, wherein said connecting members comprise magnets, said members to be connected comprising magnetic members adapted to be attracted to said magnets.

11. A linear motion rolling guide unit apparatus according to claim 1, wherein said members to be connected comprise magnets, said connecting members comprising magnetic members adapted to be attracted to said magnets.

12. A linear motion rolling guide unit apparatus according to claim 1, wherein said connecting members comprise angled members fixed pivotably to said track rails, said members to be connected comprising hooks adapted to be engaged with said angled members owing to a resilient force of spring members provided on said angled members.

13. A linear motion rolling guide unit apparatus according to claim 12, wherein said angled member fixed to one of said track rails is moved pivotally against a resilient force of a relative spring member when a projecting inclined surface provided on the other track rail presses an inclined contact surface provided on said angled member, in accordance with a relative movement of said two track rails, whereby the engaged condition of said angled member and said hook is cancelled.

14. A linear motion rolling guide unit apparatus according to claim 1, wherein said sliders are formed by fixing to each other unitarily first sliders saddled and slidingly moved on one track rail, and second sliders saddled and slidingly moved on the other track rail.

15. A linear motion rolling guide unit apparatus according to claim 1, wherein one of said track rails is fixed to a base and forms a fixed track rail, the other track rail forming a movable track rail to which a table is fixed.

16. A linear motion rolling guide unit apparatus according to claim 15, wherein a ball nut housing, which is adapted to be moved by a turning movement of ball screws fixed to said base, is fixed to said table.

17. A linear motion rolling guide unit apparatus according to claim 1, wherein at least one of said sliders is joined to said fixed track rail and stopped while one of said track rails is moved.

18. A linear motion rolling guide unit apparatus according to claim 1, wherein rolling elements are loaded in raceways formed by said first raceway grooves in said track rails and said second raceway grooves in said sliders, in such a manner that said rolling elements roll in said raceways.

* * * * *